United States Patent
Weiler et al.

(10) Patent No.: US 8,595,416 B1
(45) Date of Patent: Nov. 26, 2013

(54) WEAR-LEVELING SYSTEM AND METHOD

(75) Inventors: Patrick J. Weiler, Northborough, MA (US); James Guyer, Northborough, MA (US)

(73) Assignee: EMC Corporation, Hopkinton, MA (US)

( * ) Notice: Subject to any disclaimer, the term of this patent is extended or adjusted under 35 U.S.C. 154(b) by 146 days.

(21) Appl. No.: 13/077,820

(22) Filed: Mar. 31, 2011

(51) Int. Cl.
*G06F 12/00* (2006.01)
*G06F 13/00* (2006.01)
*G06F 13/28* (2006.01)

(52) U.S. Cl.
USPC .................................................. 711/103

(58) Field of Classification Search
USPC .................................................. 711/103
See application file for complete search history.

(56) References Cited

U.S. PATENT DOCUMENTS

| 6,903,972 | B2 * | 6/2005 | Lasser et al. | 365/185.18 |
| 2011/0173378 | A1 * | 7/2011 | Filor et al. | 711/103 |
| 2011/0264843 | A1 * | 10/2011 | Haines et al. | 711/103 |
| 2012/0151254 | A1 * | 6/2012 | Horn | 714/6.22 |

* cited by examiner

*Primary Examiner* — Alford W. Kindred
*Assistant Examiner* — Craig Goldschmidt
(74) *Attorney, Agent, or Firm* — Brian J. Colandreo; Mark H. Whittenberger; Holland & Knight LLP (57) ABSTRACT

A method, computer program product, and computing system for identifying a low-write-frequency portion of a solid-state storage device. If it is determined that the low-write-frequency portion is of sufficient size to function as over-provisioning space for the solid-state storage device, the low-write-frequency portion is utilized as over-provisioning space.

18 Claims, 4 Drawing Sheets

WEAR-LEVELING SYSTEM AND METHOD

TECHNICAL FIELD

This disclosure relates to solid-state memory systems and, more particularly, to wear-leveling solid-state memory systems.

BACKGROUND

Solid-state storage devices (such as flash memory devices) have a downside in that the storage device is degraded each time that data is written to it. Specifically, each storage cell within the solid-state memory system can typically only be written to approximately 10,000 times and then it may no longer work.

Accordingly, wear-leveling methodologies are often employed to move data around to wear out the entire memory system simultaneously. These systems usually utilize extra "hidden" storage capacity (i.e. over-provisioning space) so that data may be swapped into these "hidden" areas to increase the likelihood of more uniform wear and to also allow the solid-state storage device to maintain its rated capacity even after the individual storage cells begin to fail. Typically the extra "hidden" storage capacity (i.e. over-provisioning space) is a fairly significant amount (e.g., 40% to the total capacity). Accordingly, a 500 gigabyte drive would have approximately 200 gigabytes of extra "hidden" storage capacity available for swapping.

Often, solid-state storage technology is used in data vaulting applications. As is known in the art, data vaulting is the process of storing a "snapshot" of the content of volatile memory at the time of a power/system failure. Accordingly, once the power/system is restored, the volatile memory may be repopulated with the data included within the snapshot and the system associated with the volatile memory may resume functioning as it had just prior to the power/system failure. Accordingly, through the data vaulting process, the impact associated with a power/system failure may be reduced, as the impacted system may quickly return to functionality once the power/system failure is rectified.

As data vaulting only occurs during a power/system failure event, the individual storage cells included within the solid-state storage device used for data vaulting are essentially only written to and read from once for each power/system failure event. Accordingly and due to such a low quantity of write operations, such data vaulting memory systems often do not require wear-leveling. For example and during a typical power/system failure event: power is lost; the content of dynamic DRAM is stored quickly within the solid-state data vault; and the content of the solid-state data vault is read upon restoration of the system and used to populate the dynamic DRAM. Accordingly, a solid-state data vault is only used in the event of a power/system failure.

SUMMARY OF DISCLOSURE

In a first implementation, a method of utilizing low-write-frequency space includes identifying a low-write-frequency portion of a solid-state storage device. If it is determined that the low-write-frequency portion is of sufficient size to function as over-provisioning space for the solid-state storage device, the low-write-frequency portion is utilized as over-provisioning space.

One or more of the following features may be included. The low-write-frequency portion of the solid-state storage device may include vault storage space. The low-write-frequency portion of the solid-state storage device may include data warehousing storage space. The solid-state storage device may be a flash hard drive.

Determining if the low-write-frequency portion is of sufficient size to function as over-provisioning space for the solid-state storage device may include determining if the low-write-frequency portion is at least equal to a defined minimum over-provisioning space for the solid-state storage device. The defined minimum over-provisioning space may be a quantity of storage space. The defined minimum over-provisioning space may be a percentage of the solid-state storage device.

In another implementation, a computer program product resides on a computer readable medium and has a plurality of instructions stored on it. When executed by a processor, the instructions cause the processor to perform operations including identifying a low-write-frequency portion of a solid-state storage device. If it is determined that the low-write-frequency portion is of sufficient size to function as over-provisioning space for the solid-state storage device, the low-write-frequency portion is utilized as over-provisioning space.

One or more of the following features may be included. The low-write-frequency portion of the solid-state storage device may include vault storage space. The low-write-frequency portion of the solid-state storage device may include data warehousing storage space. The solid-state storage device may be a flash hard drive.

Determining if the low-write-frequency portion is of sufficient size to function as over-provisioning space for the solid-state storage device may include determining if the low-write-frequency portion is at least equal to a defined minimum over-provisioning space for the solid-state storage device. The defined minimum over-provisioning space may be a quantity of storage space. The defined minimum over-provisioning space may be a percentage of the solid-state storage device.

In another implementation, a computing system includes at least one processor and at least one memory architecture coupled with the at least one processor. A first software module is executed on the at least one processor and the at least one memory architecture. The first software module is configured to perform operations including identifying a low-write-frequency portion of a solid-state storage device. A second software module is executed on the at least one processor and the at least one memory architecture. The second software module is configured to perform operations including utilizing the low-write-frequency portion as over-provisioning space if it is determined that the low-write-frequency portion is of sufficient size to function as over-provisioning space for the solid-state storage device.

One or more of the following features may be included. The low-write-frequency portion of the solid-state storage device may include vault storage space. The low-write-frequency portion of the solid-state storage device may include data warehousing storage space. The solid-state storage device may be a flash hard drive.

Determining if the low-write-frequency portion is of sufficient size to function as over-provisioning space for the solid-state storage device may include determining if the low-write-frequency portion is at least equal to a defined minimum over-provisioning space for the solid-state storage device. The defined minimum over-provisioning space may be a quantity of storage space. The defined minimum over-provisioning space may be a percentage of the solid-state storage device.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
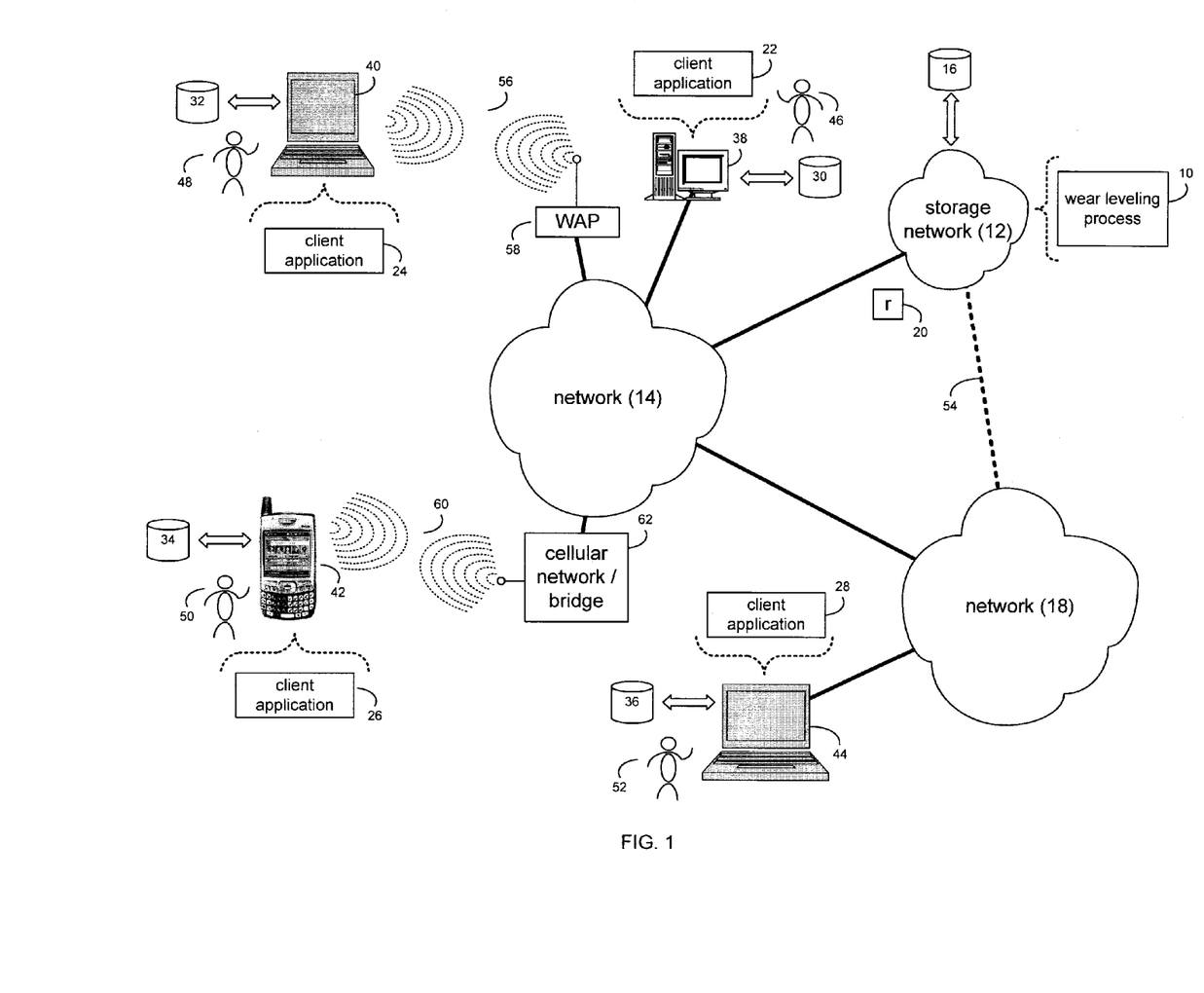
FIG. 1 is a diagrammatic view of a storage network and a wear-leveling process coupled to a distributed computing network.

Referring to FIG. 1, there is shown wear-leveling process 10 that may reside on and may be executed by storage network 12, which may be connected to network 14 (e.g., the Internet or a local area network). Examples of storage network 12 may include, but are not limited to: a Network Attached Storage (NAS) system and a Storage Area Network (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, wear-leveling process 10 may identify a low-write-frequency portion of a storage device. If it is determined that the low-write-frequency portion is of sufficient size to function as over-provisioning space for the storage device, the low-write-frequency portion is utilized as over-provisioning space.

The instruction sets and subroutines of wear-leveling process 10, which may be stored on storage device 16 included within storage network 12, may be executed by one or more processors (not shown) and one or more memory architectures (not shown) included within storage network 12. Storage device 16 may include but is not limited to: a hard disk drive; a tape drive; an optical drive; a RAID array; a random access memory (RAM); a read-only memory (ROM); and flash memory.

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), and all forms of flash memory storage devices. Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
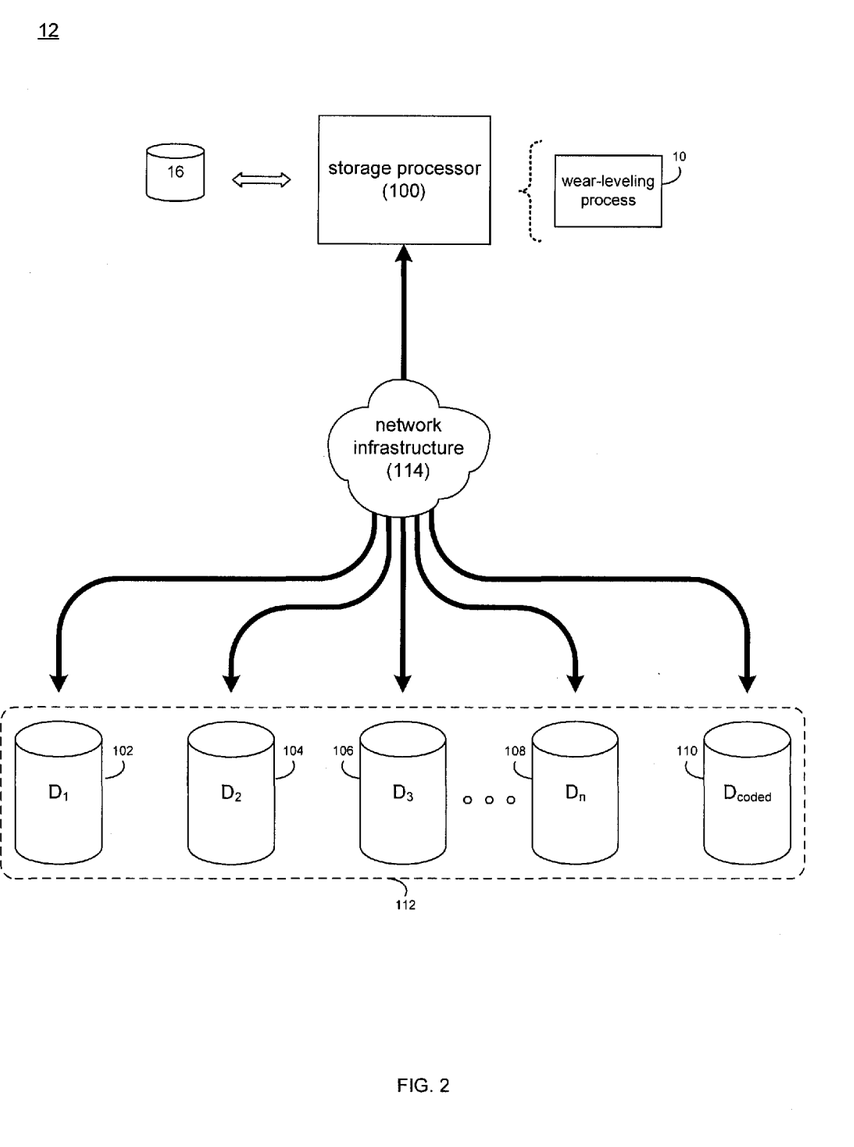
FIG. 2 is a diagrammatic view of the storage network of FIG. 1.

The Wear-Leveling Process:

Referring also to FIG. 2, storage network 12 may include at least one storage processor (e.g. storage processor 100), examples of which may include but are not limited the types of storage processors included within the CLARiiON series arrays offered by The EMC Corporation of Hopkinton, Mass. While storage network 12 is shown to include a single storage processor (i.e. storage processor 100), this is for illustrative purposes only and is not intended to be a limitation of this disclosure, as other configurations are possible and are considered to be within the scope of this disclosure. For example, storage network 12 may be configured in a high availability fashion and one or more additional storage processors storage processors (not shown) may be included within storage network 12. In the event that storage network 12 includes a plurality of storage processors, each storage processor may be configured as a hot-swappable field replaceable unit (FRU).

Storage processor 100 may be configured to allow for front-end connectivity to "hosts". Examples of such hosts may include but are not limited to the various computers, servers, and client electronic devices that are connected to e.g. networks 14, 18. Additionally, storage processor 100 may be configured to allow for back-end connectivity to various disk arrays, which will be discussed below in greater detail.

The storage processors (e.g. storage processor 100) included within storage network 12 may include cache memory (not shown) that may be segmented into read cache memory (not shown) and write cache memory (not shown). Read cache memory may be used for staging/prefetching data for filling data read requests received from a host and write cache memory may be used to accelerate data write request received from a host.

Storage network 12 may further include a plurality of storage devices $D_{1-n}$ (e.g. storage devices 102, 104, 106, 108). Storage devices 102, 104, 106, 108 may be configured to provide various levels of performance and/or high availability. For example, one or more of storage devices 102, 104, 106, 108 may be configured as a RAID 0 array, in which data is striped across storage devices. By striping data across a plurality of storage devices, improved performance may be realized. However, RAID 0 arrays do not provide a level of high availability. Additionally/alternatively, one or more of storage devices 102, 104, 106, 108 may be configured as a RAID 1 array, in which data is mirrored between storage devices. By mirroring data between storage devices, a level of high availability is achieved as multiple copies of the data are stored within storage network 12.

While in this particular example, storage network 12 is shown to include four storage devices (e.g. storage devices 102, 104, 106, 108), this is for illustrative purposes only and is not intended to be a limitation of this disclosure. Specifically, the actual number of storage devices may be increased or decreased depending upon e.g. the level of redundancy/performance/capacity required.

Storage network 12 may also include one or more coded targets 110. As is known in the art, a coded target may be used to store coded data that may allow for the regeneration of data lost/corrupted on one or more of storage devices 102, 104, 106, 108. An example of such a coded target may include but is not limited to a hard disk drive that is used to store parity data within a RAID array.

While in this particular example, storage network 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

A combination of storage devices 102, 104, 106, 108 and coded target 110 may form non-volatile, memory system 112. Examples of storage devices 102, 104, 106, 108 and coded target 110 included within non-volatile, memory system 112 may include but are not limited to a plurality of electromechanical hard disk drives and/or a plurality of solid-state flash disk drives.

The manner in which storage network 12 is implemented may vary depending upon e.g. the level of redundancy/performance/capacity required. For example, storage network 12 may be a RAID device in which storage processor 100 is a RAID controller card and storage devices 102, 104, 106, 108 and/or coded target 110 are individual "hot-swappable" hard disk drives. An example of such a RAID device may include but is not limited to an NAS device. Alternatively, storage network 12 may be configured as a SAN, in which storage processor 100 may be a dedicated device (e.g., a CLARiiON storage processor) and each of storage devices 102, 104, 106, 108 and/or coded target 110 may be a RAID device.

The various components of storage network 12 (e.g. storage processor 100, storage devices 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage processor 100 may execute all or a portion of wear-leveling process 10. Additionally, one or more of storage devices 102, 104, 106, 108 and/or coded target 110 may execute all or a portion of wear-leveling process 10. For example, wear-leveling process 10 may be a multi-component process that includes e.g., a storage-processor-based component (not shown) and a target-based component (not shown).

For example and for illustrative purposes, the storage-processor-based component of wear-leveling process 10 may be executed on storage processor 100. Further and for illustrative purposes, the target-based component of wear-leveling process 10 may be executed on each of storage devices 102, 104, 106, 108 and/or coded target 110. Accordingly, the storage-processor-based component of wear-leveling process 10 and the target-based component(s) of wear-leveling process 10 may cooperatively operate to effectuate all of the functionality of wear-leveling process 10.

The instruction sets and subroutines of the storage-processor-based component of wear-leveling process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); and a read-only memory (ROM).

The instruction sets and subroutines of the target-based component(s) of wear-leveling process 10, which may be stored on a storage device (not shown) coupled to e.g., each of storage devices 102, 104, 106, 108 and/or coded target 110 may be executed by one or more processors (not shown) and one or more memory architectures (not shown) included within each of storage devices 102, 104, 106, 108 and/or coded target 110. The storage device (not shown) may include but is not limited to: a hard disk drive; a tape drive; an optical drive; a RAID device; a random access memory (RAM); and a read-only memory (ROM).

Figure 3:
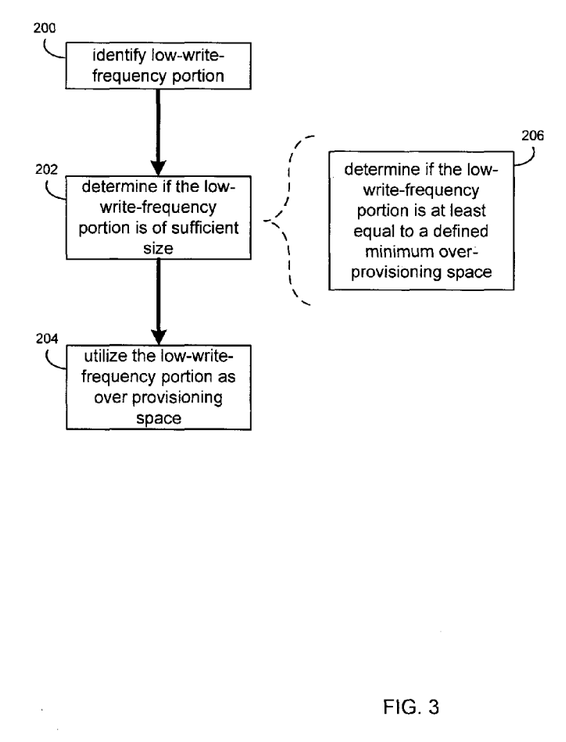
FIG. 3 is a flowchart of the wear-leveling process of FIG. 1.
Figure 4:
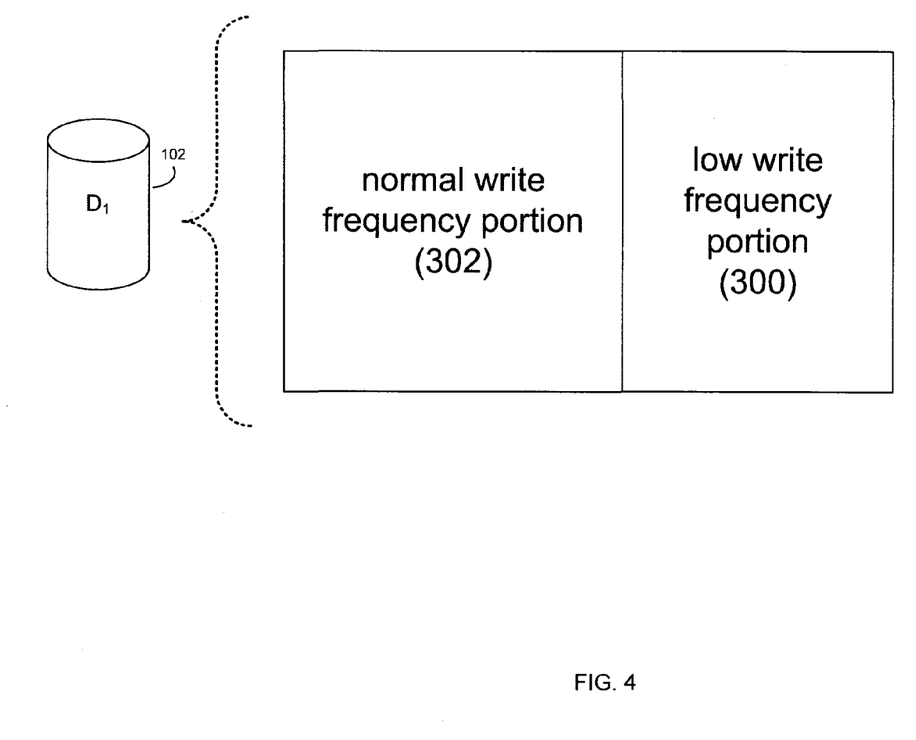
FIG. 4 is a diagrammatic view of a disk drive.

Referring also to FIGS. 3 & 4 and as discussed above, wear-leveling process 10 may identify 200 a low-write-frequency portion (e.g., low-write-frequency portion 300) of a storage device (e.g., storage device 102), as compared to normal-write-frequency portion 302. Examples of low-write-frequency portion 300 may include but is not limited to vault storage space and/or data warehousing storage space.

As discussed above, vault storage space is storage space that is used only during data vaulting operations. As discussed above, data vaulting operations only occur in the event of a power/system failure. Since data is only written to the vault storage space during a power/system failure event, the individual storage cells (within storage device 102) into which the vault data is written will be written very infrequently. For example, if a vaulting event occurs once per month, it will take over 830 years (i.e. 10,000 months) for the respective storage cells to achieve the amount write cycles (i.e. 10,000) that would likely result in the failure of a storage cell. Accordingly, these storage cells will (typically) never wear out; as they will never suffer the usage-based failure described in the background of this disclosure. Therefore, vault storage space qualifies as a low-write-frequency portion of storage device 102.

Data warehousing storage space includes storage space that is used for long-term data warehousing purposes (as opposed to standard data storage purposes in which data is repeatedly overwritten). For example, assume that storage network 12 is utilized to store a monthly differential backup of data. As the backup is differential, only those files within the data that has changed since the last backup are overwritten. Accordingly, if the file is stored within the backup and never changes, the individual storage cells (within storage device 102) into which the non-changing file is written will only be written once and (theoretically) will never be rewritten. Accordingly, these storage cells will never wear out, as they will never suffer the usage-based failure described in the background this disclosure. Further, even if the warehouse data is overwritten once per month (e.g., when a full backup is performed), it will again take over 830 years (i.e. 10,000 months) for the respective storage cells to achieve the amount of write cycles (i.e. 10,000) that would likely result in the failure of a storage cell. Accordingly, these storage cells will (typically) never wear out; as they will never suffer the usage-based failure described in the background of this disclosure. Therefore, data warehousing storage space qualifies as a low-write-frequency portion of storage device 102.

When wear-leveling process 10 identifies 200 a low-write-frequency portion (e.g., low-write-frequency portion 300) of storage device 102), wear-leveling process 10 may allow a user (not shown) to define the quantity of low-write-frequency storage space. For example, if e.g. storage device 102 is going to be used solely as data vaulting or data warehousing storage space, the entire storage space of storage device 102 may be identified 200 by the user as a low-write-frequency portion.

As discussed above, typically the extra "hidden" storage capacity (i.e. over-provisioning space) included within storage device is a fairly significant amount (e.g., 40% to the total capacity). Accordingly, a 500 gigabyte drive may have approximately 200 gigabytes of extra "hidden" storage capacity (i.e. over-provisioning space) available for swapping. Accordingly, while the actual capacity of storage device 102 may be 700 gigabytes, only 500 gigabytes of that 700 gigabytes would be mappable (i.e. usable), as 200 gigabytes of the 700 gigabytes would be "hidden" for use as over-provisioning space.

However and for the reasons discussed above, since in this particular example, 100% of storage device 102 is going to be used as data vaulting or data warehousing storage space, the need for such over-provisioning space is drastically reduced/eliminated, as it is highly likely that none of the cells within storage device 102 will suffer the usage-based failure described above in the background of this disclosure.

Continuing with the above-stated example, assume that the user of storage network 12 identifies 200 (via wear-leveling process 100) that 100% of the 500 gigabytes of usable storage space included within storage device 102 will be used for data vaulting. Wear-leveling process 10 may determine 202 if the low-write-frequency portion (e.g., low-write-frequency portion 300) identified 200 is of sufficient size to function as over-provisioning space for e.g. storage device 102.

If it is determined 202 that the low-write-frequency portion (e.g., low-write-frequency portion 300) identified 200 is of sufficient size to function as over-provisioning space for e.g. storage device 102, wear-leveling process 10 may utilize 204 the low-write-frequency portion (e.g., low-write-frequency portion 300) as over-provisioning space.

When determining 202 if the low-write-frequency portion (e.g., low-write-frequency portion 300) is of sufficient size to function as over-provisioning space for storage device 102, wear-leveling process 10 may determine 206 if the low-write-frequency portion (e.g., low-write-frequency portion 300) is at least equal to a defined minimum over-provisioning space for the solid-state storage device. This defined minimum over-provisioning space may be a quantity of storage space (e.g. "X" gigabytes) or a percentage of the solid-state storage device (e.g. "Y"% of total capacity/usable capacity).

Continuing with the above-stated example and assuming that the minimum over-provisioning space is a quantity of storage space (e.g. 100 gigabytes), wear-leveling process 10 may determine 206 that the low-write-frequency portion (e.g. 500 gigabytes) is at least equal to (and actually greater than) the minimum over-provisioning space of 100 gigabytes. Accordingly, wear-leveling process 10 may utilize 204 this 500 gigabyte low-write-frequency portion (e.g., low-write-frequency portion 300) as over-provisioning space for storage device 102. Therefore, the usable capacity of storage device 102 may be increased by 200 gigabytes (i.e. the old over-provisioning space), as the old over-provisioning space may now be utilized as usable space, since the above-described low-write-frequency portion may now be utilized as the over-provisioning space.

Further and continuing with the above-stated example, assume that the minimum over-provisioning space is a percentage (e.g. 33%) of the total capacity of storage device 102. As the total capacity of storage device 102 is 700 gigabytes, 33% of 700 gigabytes is approximately 233 gigabytes. Therefore, wear-leveling process 10 may determine 206 that the low-write-frequency portion (e.g. 500 gigabytes) is at least equal to (and actually greater than) the minimum over-provisioning space of 33% of the total capacity of storage device 202 (i.e. 233 gigabytes). Accordingly, wear-leveling process 10 may utilize 204 this 500 gigabyte low-write-frequency portion (e.g. low-write-frequency portion 300) as over-provisioning space for storage device 102. Therefore, the usable capacity of storage device 102 may be increased by 200 gigabytes (i.e. the old over-provisioning space), as the old over-provisioning space may now be utilized as usable space, since the above-described low-write-frequency portion may now be utilized as the over-provisioning space.

Further and continuing with the above-stated example, assume that the minimum over-provisioning space is a percentage (e.g. 40%) of the usable capacity of storage device 102. As the usable capacity of storage device 102 is 500 gigabytes, 40% of 500 gigabytes is 200 gigabytes. Therefore, wear-leveling process 10 may determine 206 that the low-write-frequency portion (e.g. 500 gigabytes) is at least equal to (and actually greater than) the minimum over-provisioning space of 40% of the usable capacity of storage device 202 (i.e. 200 gigabytes). Accordingly, wear-leveling process 10 may utilize 204 this 500 gigabyte low-write-frequency portion (e.g. low-write-frequency portion 300) as over-provisioning space for storage device 102. Therefore, the usable capacity of storage device 102 may be increased by 200 gigabytes (i.e. the old over-provisioning space), as the old over-provisioning space may now be utilized as usable space, since the above-described low-write-frequency portion may now be utilized as the over-provisioning space.

While the example described above is a situation in which 100% of the usable capacity of storage device 102 is identified 200 as a low-write-frequency portion (e.g., low-write-frequency portion 300), the above-described calculations are performed in the same manner regardless of the percentage of storage device 102 being identified 200. For example, assume that the user of storage network 12 identifies 200 that 50% of the 500 gigabytes of usable storage space included within storage device 102 will be used for data vaulting. Accordingly and for this example, 250 gigabytes of storage device 102 will be utilized for data vaulting.

Continuing with the above-stated example and assuming that the minimum over-provisioning space is a quantity of storage space (e.g. 100 gigabytes), wear-leveling process 10 may determine 206 that the low-write-frequency portion (e.g. 250 gigabytes) is at least equal to (and actually greater than) the minimum over-provisioning space of 100 gigabytes. Accordingly, wear-leveling process 10 may utilize 204 this 250 gigabyte low-write-frequency portion (e.g., low-write-frequency portion 300) as over-provisioning space for storage device 102. Therefore, the usable capacity of storage device 102 may be increased by 200 gigabytes (i.e. the old over-provisioning space), as the old over-provisioning space may now be utilized as usable space, since the above-described low-write-frequency portion may now be utilized as the over-provisioning space.

Further and continuing with the above-stated example, assume that the minimum over-provisioning space is a percentage (e.g. 33%) of the total capacity of storage device 102. As the total capacity of storage device 102 is 700 gigabytes, 33% of 700 gigabytes is approximately 233 gigabytes. Therefore, wear-leveling process 10 may determine 206 that the low-write-frequency portion (e.g. 250 gigabytes) is at least equal to (and actually greater than) the minimum over-provisioning space of 33% of the total capacity of storage device 102 (i.e. 233 gigabytes). Accordingly, wear-leveling process 10 may utilize 204 this 250 gigabyte low-write-frequency portion (e.g. low-write-frequency portion 300) as over-provisioning space for storage device 102. Therefore, the usable capacity of storage device 102 may be increased by 200 gigabytes (i.e. the old over-provisioning space), as the old over-provisioning space may now be utilized as usable space, since the above-described low-write-frequency portion may now be utilized as the over-provisioning space.

Further and continuing with the above-stated example, assume that the minimum over-provisioning space is a percentage (e.g. 40%) of the usable capacity of storage device 102. As the usable capacity of storage device 102 is 500 gigabytes, 40% of 500 gigabytes is 200 gigabytes. Therefore, wear-leveling process 10 may determine 206 that the low-write-frequency portion (e.g. 250 gigabytes) is at least equal to (and actually greater than) the minimum over-provisioning space of 40% of the usable capacity of storage device 102 (i.e. 200 gigabytes). Accordingly, wear-leveling process 10 may utilize 204 this 250 gigabyte low-write-frequency portion (e.g. low-write-frequency portion 300) as over-provisioning space for storage device 102. Therefore, the usable capacity of storage device 102 may be increased by 200 gigabytes (i.e. the old over-provisioning space), as the old over-provisioning space may now be utilized as usable space, since the above-described low-write-frequency portion may now be utilized as the over-provisioning space.

If the low-write-frequency portion is data vaulting space, once the system is rebooted, the data within this low-write-frequency portion may be immediately overwritten, as the data is no longer needed once the system is rebooted.

However, if the low-write-frequency portion is data warehousing space, wear-leveling process 10 may need to relocate any data that is located within the low-write-frequency portion prior to it being overwritten for wear-leveling purposes, as the data within data warehousing space is needed for it archive purposes. Therefore, it is still needed after the system is rebooted.

Accordingly, if a worn portion of storage device 102 has a high level of writes (e.g., 9,000 cycles) and going forward will only be used for low-frequency-writes, the worn portion of storage device 102 will be swapped for a pristine portion of storage space selected from within the current low-write-frequency portion of storage device 102. Accordingly, if the selected pristine portion of storage device 102 includes needed data warehousing data, that data warehousing data must be moved to another memory location prior to being designated as belonging to normal-write-frequency portion 302 of storage device 102.

Typically, there is always a very small portion of this "hidden" over-provisioning space (<=3% of flash chip capacity) that cannot be utilized to enhance the rated capacity of the disk. This very small portion is typically reserved for blocks that are already marked bad by the flash chip vendor and for the few blocks that might fail in the early life of a drive. So in this application, the context of over-provisioning is referring to the part that might be swapped into the hidden areas for uniform wear.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method of utilizing low-write-frequency space comprising:
identifying a low-write frequency portion of a solid-state storage device, the solid-state storage device having a usable space and an over-provisioning space, wherein data is written to the low-write frequency portion fewer times than an average number of writes for the solid state storage device;
determining if the low-write-frequency portion is of sufficient size to function as an entire over-provisioning space for the solid-state storage device by determining if the low-write-frequency portion is at least equal to a defined minimum over-provisioning space for the solid-state storage device; and
utilizing the entire over-provisioning space as usable space for the solid-state storage device; and
utilizing the low-write-frequency portion as the entire over-provisioning space for the solid-state storage device if the low-write-frequency portion is of sufficient size.

2. The method of claim 1 wherein the low-write-frequency portion of the solid-state storage device includes vault storage space.

3. The method of claim 1 wherein the low-write-frequency portion of the solid-state storage device includes data warehousing storage space.

4. The method of claim 1 wherein the solid-state storage device is a flash hard drive.

5. The method of claim 1 wherein the defined minimum over-provisioning space is a quantity of storage space.

6. The method of claim 1 wherein the defined minimum over-provisioning space is a percentage of the solid-state storage device.

7. A computer program product residing on a non-transitory computer readable medium having a plurality of instructions stored thereon which, when executed by a processor, cause the processor to perform operations comprising:
   identifying a low-write frequency portion of a solid-state storage device, the solid-state storage device having a usable space and an over-provisioning space, wherein data is written to the low-write frequency portion fewer times than an average number of writes for the solid state storage device;
   determining if the low-write-frequency portion is of sufficient size to function as an entire over-provisioning space for the solid-state storage device by determining if the low-write-frequency portion is at least equal to a defined minimum over-provisioning space for the solid-state storage device; and
   utilizing the entire over-provisioning space as usable space for the solid-state storage device; and
   utilizing the low-write-frequency portion as the entire over-provisioning space for the solid-state storage device if the low-write-frequency portion is of sufficient size.

8. The computer program product of claim 7 wherein the low-write-frequency portion of the solid-state storage device includes vault storage space.

9. The computer program product of claim 7 wherein the low-write-frequency portion of the solid-state storage device includes data warehousing storage space.

10. The computer program product of claim 7 wherein the solid-state storage device is a flash hard drive.

11. The computer program product of claim 7 wherein the defined minimum over-provisioning space is a quantity of storage space.

12. The computer program product of claim 7 wherein the defined minimum over-provisioning space is a percentage of the solid-state storage device.

13. A computing system comprising:
   at least one processor;
   at least one physical memory architecture coupled with the at least one processor;
   a first software module executed on the at least one processor and the at least one physical memory architecture, wherein the first software module is configured to perform operations including identifying a low-write frequency portion of a solid-state storage device, the solid-state storage device having a usable space and an over-provisioning space, wherein data is written to the low-write frequency portion fewer times than an average number of writes for the solid state storage device;
   a second software module executed on the at least one processor and the at least one physical memory architecture, wherein the second software module is configured to perform operations including determining if the low-write-frequency portion is of sufficient size to function as an entire over-provisioning space for the solid-state storage device by determining if the low-write-frequency portion is at least equal to a defined minimum over-provisioning space for the solid-state storage device; and
   a third software module executed on the at least one processor and the at least one physical memory architecture, wherein the third software module is configured to perform operations including utilizing the entire over-provisioning space as usable space for the solid-state storage device; and utilizing the low-write-frequency portion as the entire over-provisioning space for the solid-state storage device if the low-write-frequency portion is of sufficient size.

14. The computing system of claim 13 wherein the low-write-frequency portion of the solid-state storage device includes vault storage space.

15. The computing system of claim 13 wherein the low-write-frequency portion of the solid-state storage device includes data warehousing storage space.

16. The computing system of claim 13 wherein the solid-state storage device is a flash hard drive.

17. The computing system of claim 13 wherein the defined minimum over-provisioning space is a quantity of storage space.

18. The computing system of claim 13 wherein the defined minimum over-provisioning space is a percentage of the solid-state storage device.

* * * * *